(12) United States Patent
Farber

(10) Patent No.: US 8,448,417 B1
(45) Date of Patent: May 28, 2013

(54) PISTONLESS, ROTARY INTERNAL COMBUSTION ENGINE AND ASSOCIATED SUPPORT SYSTEMS

(76) Inventor: Claude Farber, Waterville, NY (US)

(*) Notice: Subject to any disclaimer, the term of this patent is extended or adjusted under 35 U.S.C. 154(b) by 1697 days.

(21) Appl. No.: 11/809,961

(22) Filed: Jun. 4, 2007

(51) Int. Cl.
| | |
|---|---|
| *F02C 5/02* | (2006.01) |
| *F02C 3/14* | (2006.01) |
| *F02C 3/00* | (2006.01) |
| *F02C 3/06* | (2006.01) |
| *F02C 5/04* | (2006.01) |
| *F02K 7/00* | (2006.01) |
| *F23R 3/04* | (2006.01) |
| *F02G 1/02* | (2006.01) |
| *F02C 5/12* | (2006.01) |
| *F02C 3/16* | (2006.01) |

(52) U.S. Cl.
CPC ... *F02C 5/04* (2013.01); *F02C 5/12* (2013.01); *F02C 3/16* (2013.01); *F02C 3/165* (2013.01); *F02K 7/005* (2013.01); *F23R 3/04* (2013.01); *F02G 1/02* (2013.01); *Y02T 50/675* (2013.01); *Y02T 50/676* (2013.01)
USPC ........... 60/39.34; 60/804; 60/39.35; 60/39.63

(58) Field of Classification Search
CPC ........ F02C 5/04; F02C 5/12; F02C 3/16; F02C 3/165; F02K 7/005; F23R 3/04; F02G 1/02; Y02T 50/675; Y02T 50/676
USPC ............... 60/804, 39.63, 39.35, 39.34, 39.15, 60/793; 123/169 EL, 200, 228, 245; 324/252; 418/6
See application file for complete search history.

(56) References Cited

U.S. PATENT DOCUMENTS

| | | | | |
|---|---|---|---|---|
| 1,171,121 | A | * | 2/1916 | Heilmann ..................... 60/39.34 |
| 1,236,275 | A | | 8/1917 | Dickson |
| 1,291,273 | A | * | 1/1919 | Tyler ............................. 60/39.34 |
| 1,594,035 | A | | 7/1926 | Bailey |
| 1,717,739 | A | * | 6/1929 | Seifert .......................... 123/235 |
| 1,841,841 | A | | 1/1932 | Munn |
| 3,130,546 | A | * | 4/1964 | Hovorka ......................... 60/804 |
| 3,145,533 | A | * | 8/1964 | Ollinger ....................... 60/39.34 |
| 3,739,756 | A | | 6/1973 | Villella |
| 3,799,127 | A | * | 3/1974 | Tseng ........................... 123/228 |
| 4,215,533 | A | * | 8/1980 | Silvestri ....................... 60/39.63 |
| 4,318,370 | A | | 3/1982 | Konther et al. |

(Continued)

FOREIGN PATENT DOCUMENTS

FR    2778430 A1 * 11/1999

*Primary Examiner* — Thai Ba Trieu
(74) *Attorney, Agent, or Firm* — Mark Levy; David L. Banner; Hinman, Howard & Kattell, LLP

(57) ABSTRACT

A stationary crankshaft, cylindrical rotor, low friction, adjustable timing, pistonless, rotary internal combustion engine. A cylindrical rotor rotates freely about a stator, also cylindrical in shape. A plurality of cavities are circumferentially disposed along the external circumference of the stator and the internal circumference of the rotor that, when rotationally aligned, form combustion chambers. Rotation of the rotor is induced by electrical-spark induced combustion of a fuel/air mixture in the combustion chambers. The combustive exhaust is vented into an exhaust manifold for transport to an exhaust disposal system, such as a catalytic converter. Cooling, fuel pressurization, and electrical generation can be internal to the engine or supplied externally. Engine speed, torque, and other operational requirements can be accommodated by coupling multiple rotational units together and engine vibration can be virtually eliminated by offsetting the combustion chambers on coupled units.

35 Claims, 22 Drawing Sheets

U.S. PATENT DOCUMENTS

| | | | |
|---|---|---|---|
| 4,319,551 A * | 3/1982 | Rubinshtein | 123/245 |
| 4,463,551 A * | 8/1984 | Morris | 60/39.35 |
| 5,046,371 A * | 9/1991 | Kronberg | 73/862.337 |
| 5,138,831 A * | 8/1992 | Cowan, Sr. | 60/39.34 |
| 5,855,474 A * | 1/1999 | Shouman | 418/6 |
| 6,501,367 B2 * | 12/2002 | Fleig et al. | 338/162 |
| 7,281,513 B1 * | 10/2007 | Webb | 123/200 |
| 7,350,500 B1 * | 4/2008 | Webb | 123/200 |
| 2007/0151246 A1 * | 7/2007 | Heddrich et al. | 60/645 |
| 2011/0163746 A1 * | 7/2011 | Zimmer et al. | 324/252 |

* cited by examiner

PISTONLESS, ROTARY INTERNAL COMBUSTION ENGINE AND ASSOCIATED SUPPORT SYSTEMS

FIELD OF THE INVENTION

The present invention pertains to internal combustion engines and, more particularly, to stackable, low friction, stationary crankshaft, cylindrical rotor, multi-stage, pistonless, rotary internal combustion engines, including means for venting exhaust gases and supplying cooling, electrical power, lubrication, fuel, and air to the engines.

BACKGROUND OF THE INVENTION

Over the final decades of the twentieth and the first decade of the twenty-first centuries, the unpredictable and finite nature of non-renewable fossil fuel supplies has become increasingly apparent. Ironically, this realization has come at the precise moment when the industrialized nations of the world are demanding engines with greater power output, increased service life, and improved flexibility for automotive, military, aeronautical, and other applications. With more and more nations achieving industrialization, skyrocketing demand and fierce competition for dwindling fossil fuel resources, coupled with greater operational performance requirements, have forced engine designers and manufacturers to consider and pursue alternatives to the inefficient, reciprocating piston, rotating crankshaft, internal combustion engines that have dominated the industry for nearly a century. Presently available alternatives to engines such as hybrid and so-called "green" fuel engines are in their infancy and are unlikely to garner widespread appeal and applicability in the near future. The reasons for this are varied, but include the complexity and expense of these new technologies, the lack of widespread availability of alternative fuels, incompatibility of most alternative fuels with traditional reciprocating engines, and the reluctance of industrialized consumers and industries to sacrifice the power, speed, and reliability of modern reciprocating engines for the, at present, dubious promise of improved fuel efficiency and reduced greenhouse gas emissions.

Historically, one alternative to the conventional, reciprocating piston, rotating crankshaft engine has been the rotary internal combustion engine. Compared to the traditional, reciprocating piston engine in which a crankshaft is rotationally driven by reciprocal motion of pistons, the simplest, earliest rotary engines, with their stationary crankshafts and rotating cylinder/piston blocks, achieved higher power-to-weight ratios, were simpler to construct and maintain, had fewer moving parts, had a decreased risk of engine seizure, and experienced lower operational vibration compared to reciprocating, internal combustion engines. The advantages of early, stationary crankshaft, rotating block rotary engines, in which the rotational motion of the cylinder block circumferentially about a stationary crankshaft is still produced via gas pistons, have been common knowledge for almost a century. In fact, rotary-styled, internal combustion engines employing rotating cylinder blocks and pistons were one of the most popular aircraft engine designs in the first quarter of the twentieth century, being employed in more than half of all World War I aircraft. Such engines have seen limited application in automobiles and motorcycles. However, these stationary crankshaft, rotating block rotary engines have historically not proven any more fuel efficient than conventional reciprocating engines and are still plagued with many of the same shortcomings, including high mechanical stresses due to rapid, constant acceleration and deceleration of the cylinder pistons, seal leakage, high unit weight, and overall poor operational efficiencies. Additionally, gyroscopic effects generated by the inertia of the rotating block and the inherent difficulties in controlling engine speed, forced engine designers to concentrate their efforts on improving the operational characteristics of the traditional, reciprocating piston engines by the mid 1920s.

Another alternative to the reciprocating piston engine, the pistonless, rotary internal combustion engine, in which a rotor is used rather than pistons, has the potential for even higher power-to-weight ratios and greater fuel efficiency than rotating block, stationary crankshaft rotary engines. These engines also have the potential for longer operational life due to the virtual elimination of the high mechanical stresses caused by the constant, rapid acceleration and deceleration of the pistons, cylinders, and associated parts in the piston-driven, reciprocating and rotating block, stationary crankshaft rotary engines. Additionally, the elimination of moving cylinders, pistons, and associated hardware render the pistonless, rotary internal combustion engine lighter, more reliable, and far less prone to catastrophic mechanical failure than either the reciprocating or rotating block rotary engines, although maintaining seal integrity becomes difficult as the rotor and housing experience mechanical wear. When new, however, this minimization of moving parts and the very low friction between the rotational and fixed/stationary units significantly increases engine efficiency because less energy is lost to frictional heat generation. In turn, the reduced heat generation in the pistonless, rotary engine translates into reduced reliance on complex cooling systems when compared to conventional, reciprocating and rotating block, stationary crankshaft rotary engines. However, despite the high power-to-weight ratio and other potential benefits, the few existing, modern, pistonless, rotary engines, such as the Wankel engine introduced in the 1960s, in which the rotor assembly is eccentrically rotated about a fixed crankshaft without the aid of gas pistons, are heavily criticized for poor fuel efficiency, incomplete combustion of the air-fuel mixture, high hydrocarbon emissions, inability to effectively couple multiple stages or rotor assemblies together without complex bearing mechanisms, and poor rotor gas seals caused by the mechanical wear of the three-sided, eccentric rotor assembly and the engine housing.

Presently, no engine design exists that addresses the shortcomings of the stationary crankshaft, rotating block, rotary internal combustion or the pistonless, Wankel-styled engines. Considering the aforementioned potential advantages of a pistonless, rotary internal combustion engine over traditional reciprocating and rotating block, stationary crankshaft rotary engines in terms of power-to-weight ratios, fuel efficiency, simplicity of construction, reduced maintenance, and lower operational vibration, what is urgently needed is a pistonless, low friction, rotary engine (as well as relatively simple systems for venting exhaust gases and supplying cooling, lubrication, electrical power, fuel, and air to the engine) that provides for more complete fuel-air mixture combustion, greater seal integrity, higher power-to-weight ratios, and increased fuel efficiency than the presently available, reciprocating, rotating block, rotary, or pistonless, Wankel-styled internal combustion engines. Such a solution should be readily adaptable to operation using regular or alternative fuels, such as hydrogen, renewable biofuels, methane, and the like, without sacrificing the engine power and convenience to which the contemporary consumer has become accustomed. Additionally, such a solution could be easily configurable and/or modular, for example, stackable where multiple stages or rotors could be coupled together end-to-end to meet virtually any consumer/operational power requirement. Ideally, a solution could utilize a controlled release (or "bleed off") system for combustion gases to even further reduce engine vibration caused by combustion of the fuel-air mixture and the concussion of exhaust gases. Additionally, such a solution should permit engine cooling to be by means of forced air, liquid coolants, or some combination of both.

DISCUSSION OF RELATED ART

The following United States patents and applications address methods and/or apparatus pertaining to rotary or stationary crank internal combustion engines.

U.S. Pat. No. 4,318,370, issued to KONTHER, et al. on Mar. 9, 1982, for "Rotary Internal Combustion Engines" teaches a stationary crank engine apparatus consisting of a rotor assembly driven rotationally about a fixed axis by means of two primary and two secondary pistons such that the pistons reciprocate relative to the primary cylinders as the rotor assembly rotates.

U.S. Pat. No. 3,739,756, issued to VILLELLA on Jun. 19, 1973, for "Internal Combustion Engine" teaches a conventional, stationary crankshaft, rotating cylinder block, gas piston driven, rotary-styled engine apparatus. Combustion of a fuel-air mixture by electric spark generates axial piston motion and, ultimately, cylinder block rotation circumferentially about the fixed crankshaft.

U.S. Pat. No. 1,841,841, issued to MUNN on Jan. 19, 1932, for "Rotary Engine" describes a stationary crankshaft, rotating cylinder block, piston-and-gear driven, rotary-styled engine apparatus. Reciprocating cylinders located on the cylinder block and displaced circumferentially about a centrally positioned, geared crankshaft impart rotational motion to large gears about the crankshaft, causing the entire cylinder block to rotate.

U.S. Pat. No. 1,594,035, issued to BAILEY on Jul. 27, 1926, for "Rotary Motor" teaches a rotary motor consisting of internal and external rotor assemblies that rotate synchronously such that the internal rotor is offset from and does not share a common axis with the external rotor assembly. Vanes mechanically conjoined to either the inner or external rotor are the sole means of preventing leakage between chambers.

U.S. Pat. No. 1,236,275, issued to DICKSON on Aug. 7, 1917, for "Rotary Engine" teaches a traditional rotary internal combustion engine in which reciprocating gas pistons provide rotational motion of the cylinder block circumferentially about a stationary crankshaft.

SUMMARY OF THE INVENTION

In accordance with the present invention, there is provided a stackable, stationary crankshaft, cylindrical rotor, low friction, variable timing, pistonless, rotary internal combustion engine having means for venting combustion gases and supplying coolants, lubrication, electrical power, fuel, and air to the engine. The pistonless, rotary, internal combustion engine of the invention and described herein consists of a fixed/stationary unit of cylindrical construction and a rotational unit, also of cylindrical construction, that is free to rotate thereabout. Circumferentially disposed along the external circumference of the fixed/stationary unit and the internal circumference of the rotational unit are a plurality of cavities that, when rotationally aligned, form geometrically distinct combustion chambers. Rotational impetus is provided to the rotational unit by electrical-spark induced combustion of an atomized gas mixture delivered to the combustion chamber via a plurality of fuel lines, nozzles, and ports from a fuel disbursement chamber located within the inner diameter of the fixed/stationary unit. Combustive exhaust and fresh air inlet ports within the combustion cavity are alternatively aligned as the angled/curved surface of the cavity and a strategically placed "bleed off" port directs the combustive force and generates rotational motion of the rotational unit. The combustive exhaust is vented directly into an exhaust manifold for transport to an exhaust disposal system, such as a catalytic converter.

Typically, heat energy removal is accomplished using a cooling fan conjoined to the rotational unit of the engine, but may be optionally substituted for or supplemented by a more traditional liquid coolant system. Similarly, the fuel is supplied to the fuel disbursement chamber by means of a fuel pump rotationally conjoined to the rotational unit, but may also be external to the engine. Electrical power generation is accomplished by rotationally conjoining an electrical generator or alternator to the rotating unit. This may be accomplished, for example, by a series of gears and/or pulleys rotationally conjoined to the rotating unit and to an electrical generator. It will be recognized that other mechanisms and/or methods familiar to those skilled in the art may also be used. Consequently, the invention is not limited to any particular mechanism or method of coupling an electrical generator or alternator to the rotating unit.

Rotational units or "quads" on successive stages may be coupled together (stacked) such that the combustion chambers of each stage may be aligned, increasing initial rotational torque about the fixed/stationary unit. In alternate embodiments, successive stages may be rotationally/circumferentially offset from one another to provide for smoother and/or faster operation, decrease the time the rotational unit travels due to inertia only, further reduce operational vibration, and diminish the effects of torsional stresses between the fixed/stationary and the rotational units.

BRIEF DESCRIPTION OF THE DRAWINGS

A more complete understanding of the present invention may be obtained by reference to the accompanying drawings, when considered in conjunction with the subsequent detailed description, in which:

FIGS. 3b and 3c are detailed side, cross-sectional and rear, end views, respectively of a rear portion of the rotary engine of FIG. 3a;

FIG. 5b is a detailed side, elevational, cross-sectional view of a portion of the ignition system of FIG. 5a;

FIG. 5c is a perspective, schematic view of a barber pole contact system portion of the ignition system of FIG. 5a;

DETAILED DESCRIPTION OF THE PREFERRED EMBODIMENT

The present invention provides a stackable, stationary crankshaft, cylindrical rotor, variable timing, low friction, pistonless, rotary internal combustion engine having means for venting exhaust gases and supplying coolants, lubrication, electrical power, fuel, and air to the engine. As used herein, the term stackable replies to multiple stages or layers of combustion chambers (i.e., quads), whether assembled from layers of individual quads or manufactured as a multi-stage unit.

Figure 1:
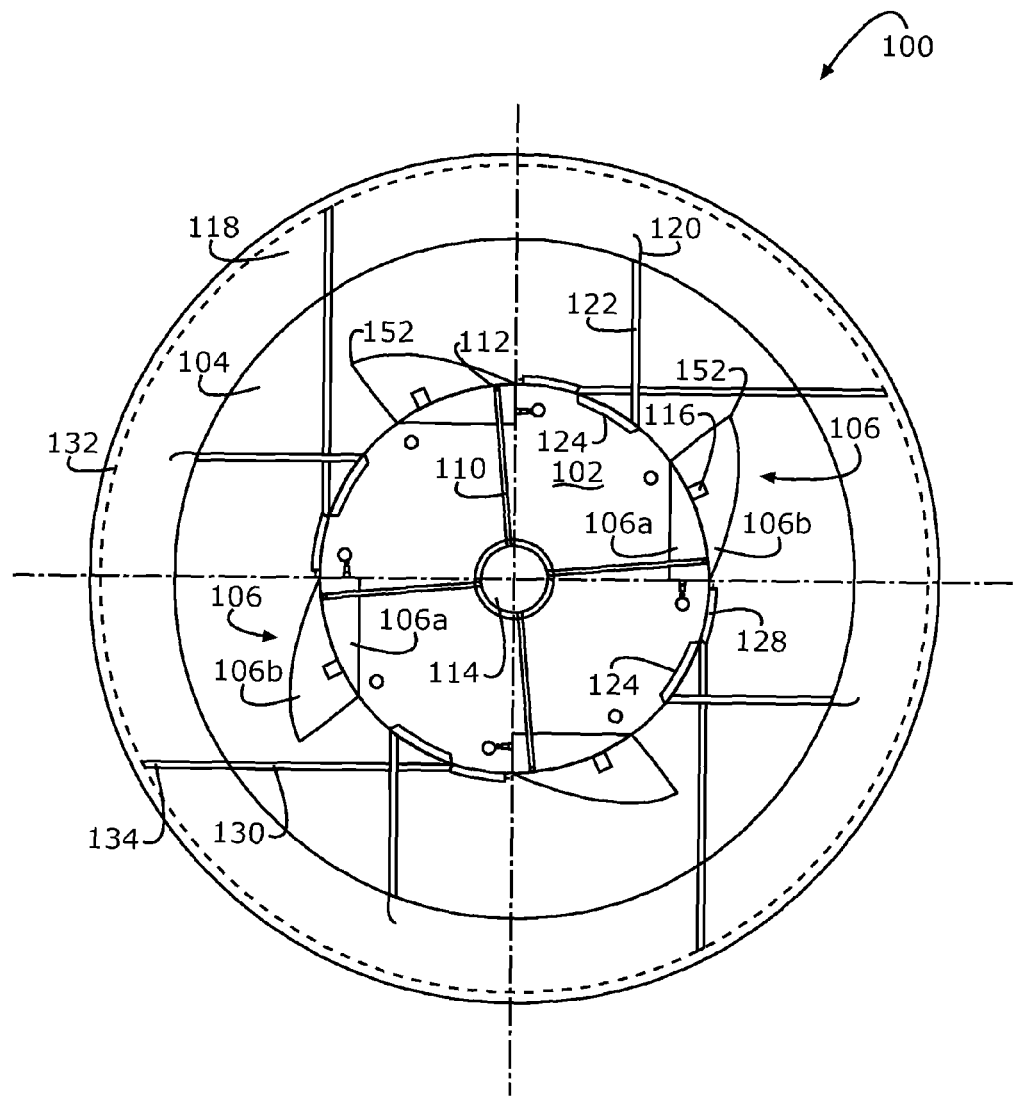
FIG. 1 is a cross-sectional plan view of one level (section) of the rotary engine in accordance with the invention.

In the following discussion, the engine of the invention is assumed to be in a horizontal orientation such that FIG. 1 is an end view. However, terms such as forward and rearward are used to describe engine components relative to the direction of rotation. While the engine used for purposes of disclosure exhibits counter clockwise (CCW) rotation, it will be recognized that a clockwise (CW) rotational direction may be achieved by "mirror imaging" certain disclosed components and arrangements. Consequently, the invention includes by CW and CCW rotating engines.

Figure 2:
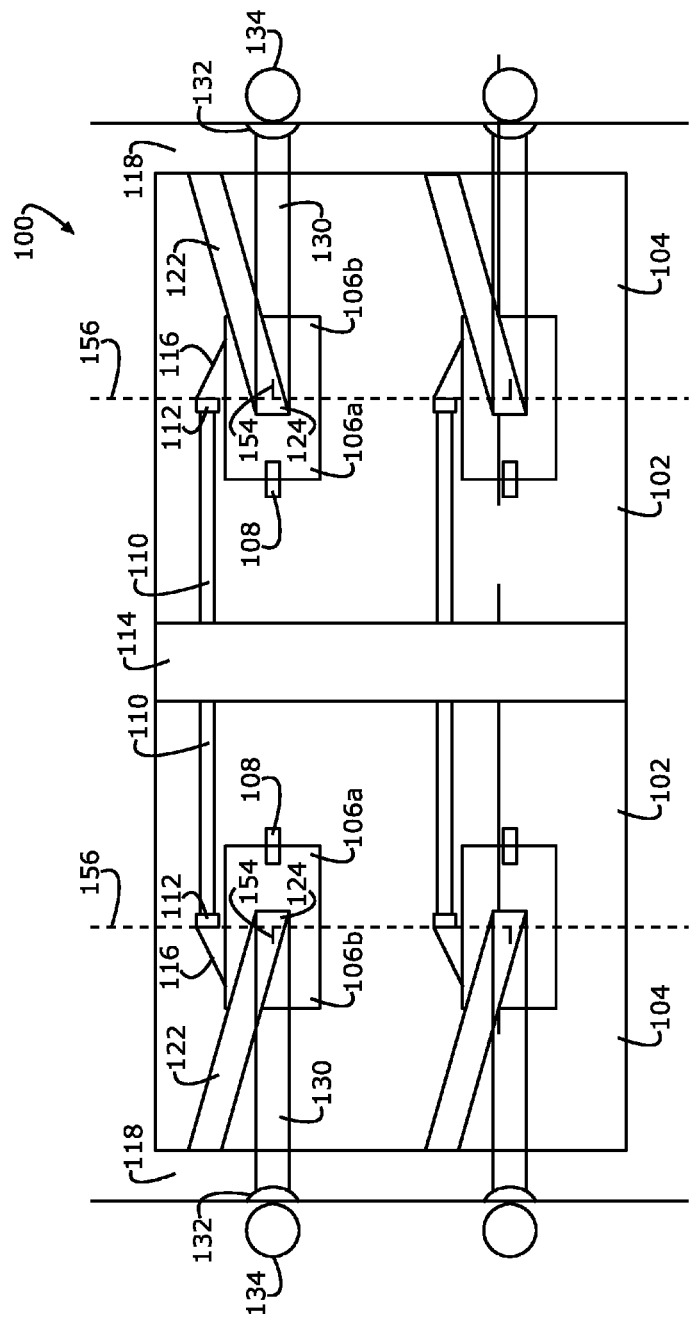
FIG. 2 is a side, elevational, cross-sectional view of two adjacent sections as shown in FIG. 1 of the rotary engine.

Referring first to FIGS. 1 and 2, there are shown an end, elevational, cross-sectional view of one section of the rotary engine and a side, elevational, cross-sectional view of two adjacent sections of the rotary engine of the invention, generally at reference number 100. Engine section 100 has a fixed, inner stationary portion 102 (i.e., a stator) surrounded by a concentric movable portion 104 (i.e., a rotor). The major outer diameter of stator 102 is sufficiently small such that the major inner perimeter surface of rotator 104 contacts it, but rotor 104 is free to rotate circumferentially about the major outer perimeter surface of stator 102. In FIG. 2, lines 156 indicate the demarcation between stator 102 and rotor 104.

A series of four circumferentially disposed combustion chambers 106, each comprising a stationary, stator combustion chamber portion 106a and a rotor combustion chamber portion 106b, are spaced equidistantly around engine section 100. The arrangement of four circumferentially disposed combustion chambers 106 forms a so-called "quad". While four circumferentially disposed combustion chambers 106 are shown for purposes of disclosure, it will be recognized that other numbers of circumferentially disposed combustion chambers may be used to meet a particular operating circumstance or environment. Stator combustion chamber portion 106a and rotor combustion chamber portion 106b each have a substantially triangular shape, with one or more of wall portion of each thereof optionally being curvilinear. An apex 152 is identified in a forward, outer corner of rotor combustion chamber portion 106b.

A sparkplug 108 is disposed in a wall of each stator combustion chamber 106a.

A fuel supply duct 110 extends from a central fuel supply chamber 114 disposed in center region of stator 102. Central fuel supply chamber 114 is described in detail hereinbelow. Each fuel supply duct 110 terminates at the outer perimeter of stator 102 in a nozzle 112.

Each rotor combustion chamber portion 106b has a fuel inlet port 116 disposed in an upper region thereof and communicative therewith. Fuel inlet port 116 is adapted and configured to receive fuel from nozzle 112 as fuel inlet port 116 passes nozzle 112 during rotation of rotor 104 as described in detail hereinbelow.

A combustion air supply chamber 118 surrounds rotor 104. An air scoop 120 disposed on the outer periphery of rotor 104 direct air into a distal end of combustion air inlet duct 122 disposed within rotor 104. The proximal end of air inlet duct 122 terminates in air inlet cavity 124 disposed in stator 102 proximate the inner periphery of rotor 104. As described in detail hereinbelow, during certain periods of the rotation of rotor 104 around stator 102, air inlet cavity 124 is communicative with venting cavity 126, typically a small slit, disposed in stator 102.

Exhaust cavity 128 is disposed in rotor 104. Exhaust cavity 128 is connected to the proximal end of exhaust duct 130. A distal end of exhaust duct 130 connects to exhaust ring 132 and, subsequently to exhaust pipe 134.

Figure 2A:
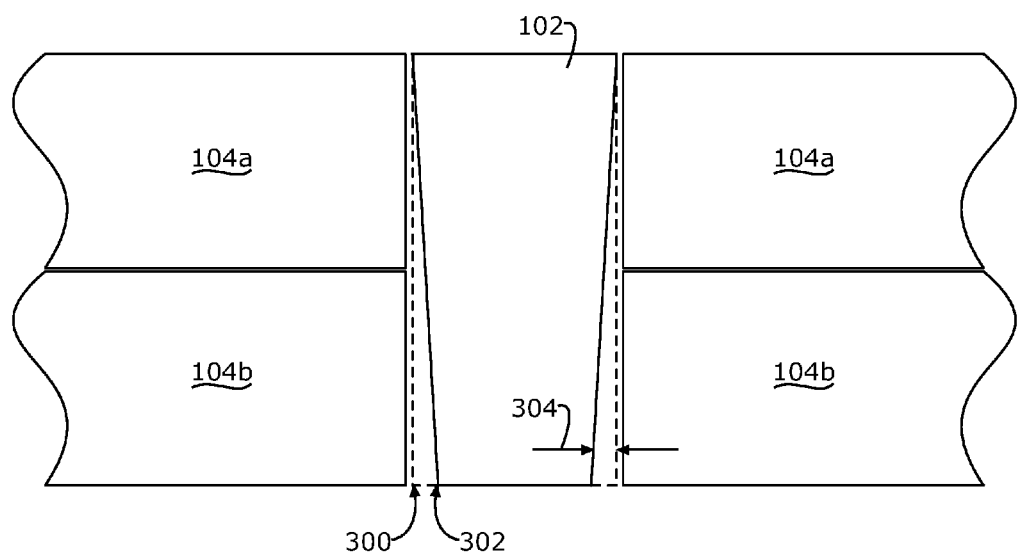
FIG. 2a is simplified, side, elevational, cross-sectional view of the two adjacent sections as shown in FIG. 1 of the rotary engine showing an axial taper of the stator portion of the rotary engine with respect to the rotor portion of the rotary engine.

Referring now also to FIG. 2a, the taper of stator 102 is illustrated. Stator 102 is shown with broken side lines 300 representing an embodiment wherein stator 102 was cylindrical (i.e., not tapered). Solid lines 302 represent the actual sides of stator 102 in a tapered embodiment having an axial taper. The distance between broken line 300 and solid line 302 is a distance 304 representative of the taper. It will be recognized that the illustration of FIG. 2a is schematic and the illustrated taper is greatly exaggerated. The actual taper 304 is assumed to be in thousandths or tens of thousandths of an inch.

Figure 3A:
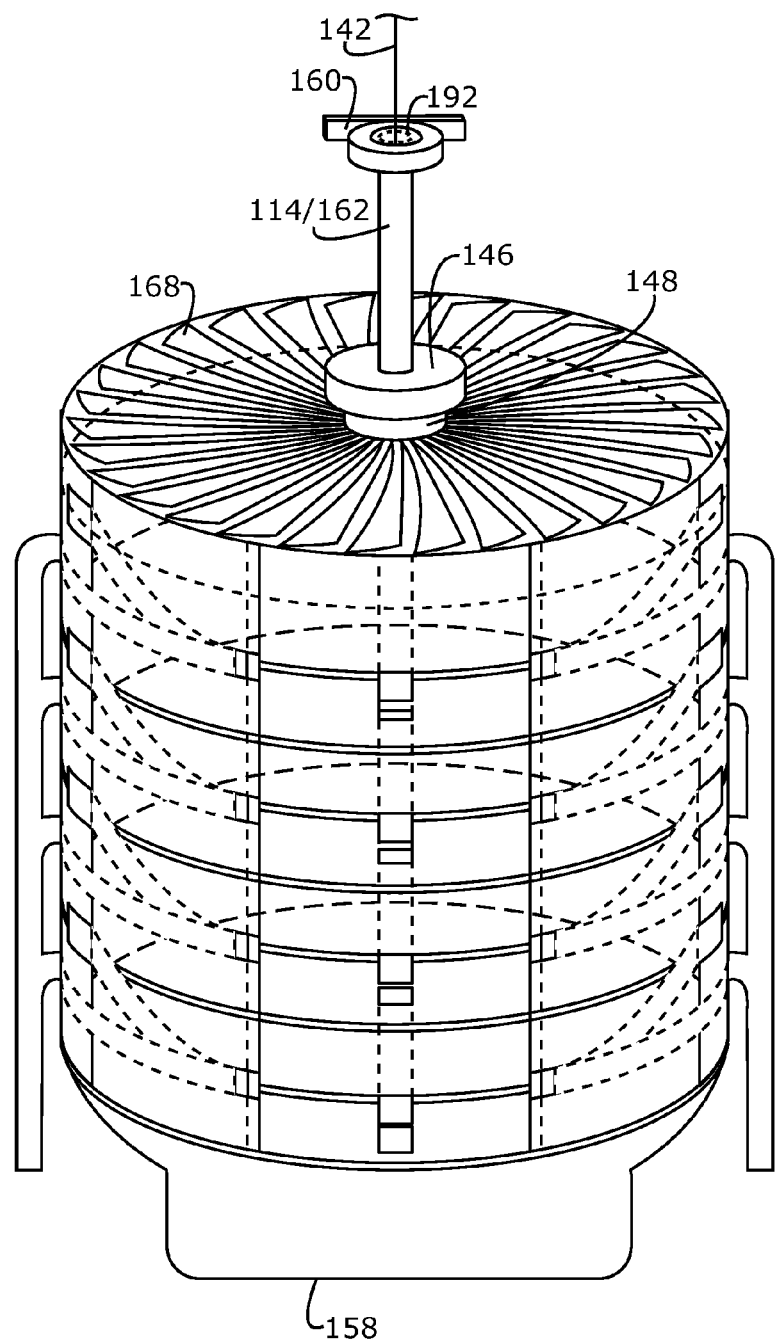
FIG. 3a is a general side, perspective view of the stator and rotor portions of a four stage version of the rotary engine of the invention.
Figure 4:
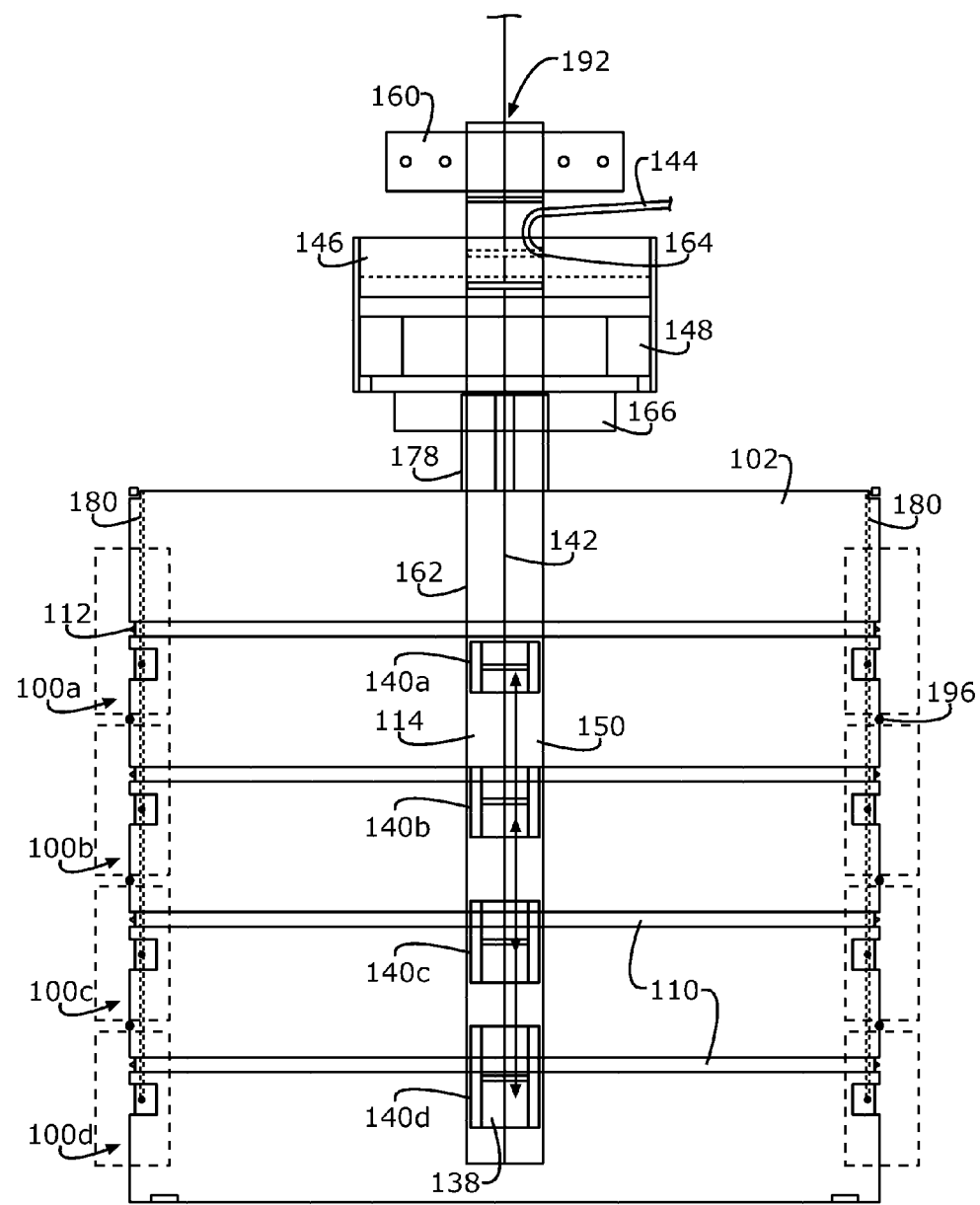
FIG. 4 is detailed, cross-sectional view of the stator portion of FIG. 3.

Referring now to FIGS. 3a and 4, there are shown a general side, perspective view and a detailed, cross-sectional view of a rotor and stator portions and a stator portion, respectively, of a four stage or layer version of the rotary engine 100 of the invention. In FIGS. 3a and 4, ancillary components necessary for the operation of the inventive rotary engine may be seen. A pillow block or similar support mechanism 160 secures a first, forward end of stationary hollow central shaft 162. Typically, a pressure relief valve 192 is disposed in the forward end of stationary hollow shaft 162. Typically, pressure relief valve 192 is frictionally engaged and adapted to pop out under an overpressure condition in the pressurized fuel system. Such valves are believed to be known to those of skill in the art and function in a manner similar to a "freeze" plug typically included in the block of a water-cooled, internal combustion engine, not shown.

A second, rear end of shaft 162 is secured by base 158. A thrust bearing, not shown, disposed within base 158 provides a forward bias on stationary hollow shaft 162 to compensate for wear at the interface between stator 102 and rotor 104. The use of thrust bearings is also believed to be known to those of skill in the art and, consequently, is not discussed in further detail herein.

A fuel pump 146 is disposed rearward from pillow block 160. Fuel pump 146 receives fuel, not shown, from an external fuel reservoir, not shown, through a fuel supply line 144 and pressurizes the fuel before providing pressurized fuel directly into central fuel supply chamber 114. In alternate embodiments, an external, typically electrically-powered, fuel pump, not shown, may be substituted for fuel pump 146. A "slip-ring" mechanism 164, known to those of skill in the art, may be used to pass the fuel into fuel pump 146 and/or into stationary central fuel chamber 114.

An electrical generator 148 is disposed rearward of fuel pump 146. Generator 148 has a stationary inner stator and a rotor portion, neither specifically identified, operatively attached to engine rotor 104. Generator 148 produces an electrical current for ignition of the fuel/gas mixture in combustion chambers 106 as described in detail hereinbelow. Generator 148 may be a magneto or other type generator combined with a voltage step-up system, not shown, to provide ignition voltage to spark plugs 108 (FIG. 1). The distribution of ignition voltage from generator 148 as well as a timing advance system for ensuring that combustion occurs at an optimum point in the ignition cycle is discussed in detail hereinbelow.

A fan 168 supported by fan bearing 166 is disposed inline behind fuel pump 146. Fan 168 is configured to provide pressurized air to pressurized combustion air supply chamber 118 (FIG. 1).

Figure 3B:
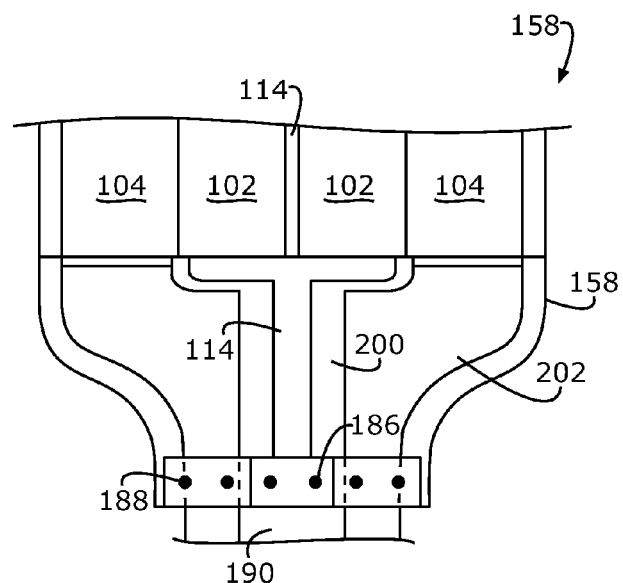
Figure 3C:
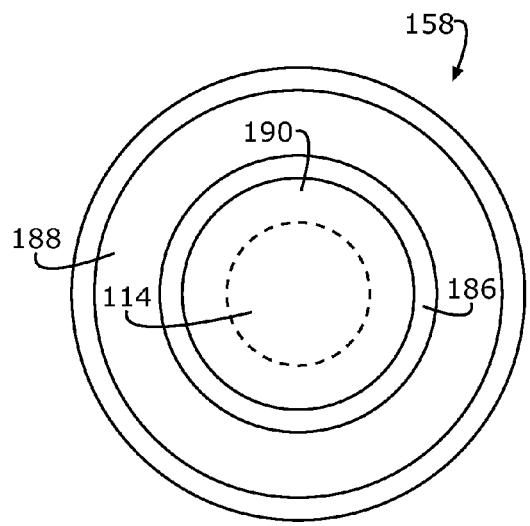

Referring now also to FIGS. 3b and 3c, there are shown detailed cross-sectional and rear elevational views, respectively, of common bearing base 158 disposed at the rear end of engine 100. A rear support, not shown, supports both the fixed and rotating portions of the rear of engine 100. Fuel Supply chamber 114 is supported by inner rear bearing 186. Shaft 190 is the rearward extension of the rotor 104, connected thereto by structure 202. Shaft 190 is allowed to rotate between inner rear bearing 186 and outer rear bearing 188 and provides means for coupling the rotary output from engine 100 to an external load (e.g., a drive train), not shown. A structure 200 couples the stator to inner rear bearing 186. A housing, not specifically identified, encloses rear support block, not specifically identified.

Figure 5A:
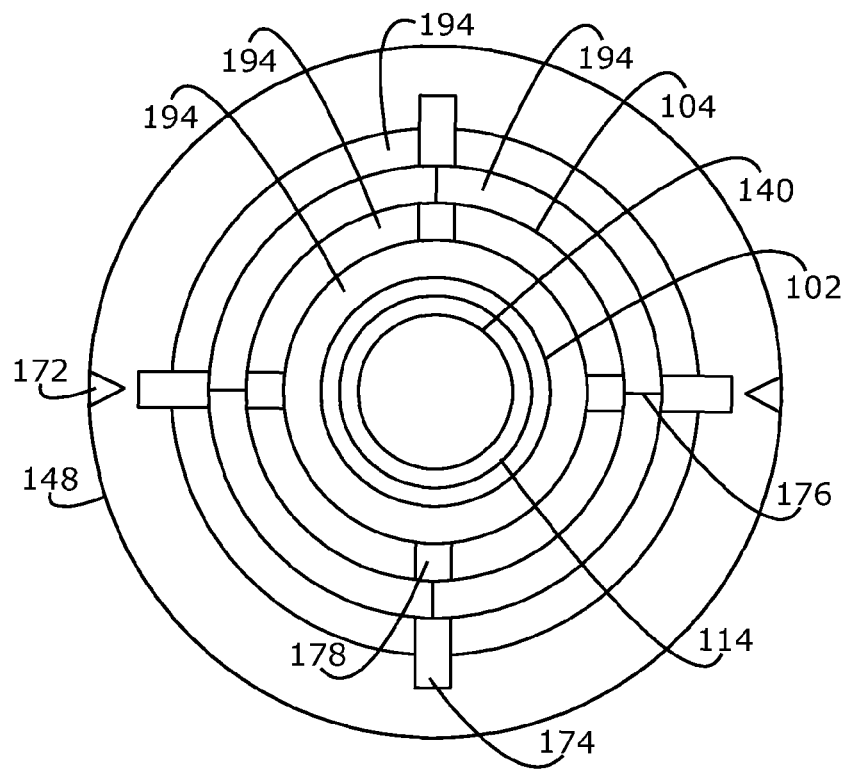
FIG. 5a is a detailed, cross-sectional view of a portion of the ignition system of the rotary engine of the invention.
Figure 5B:
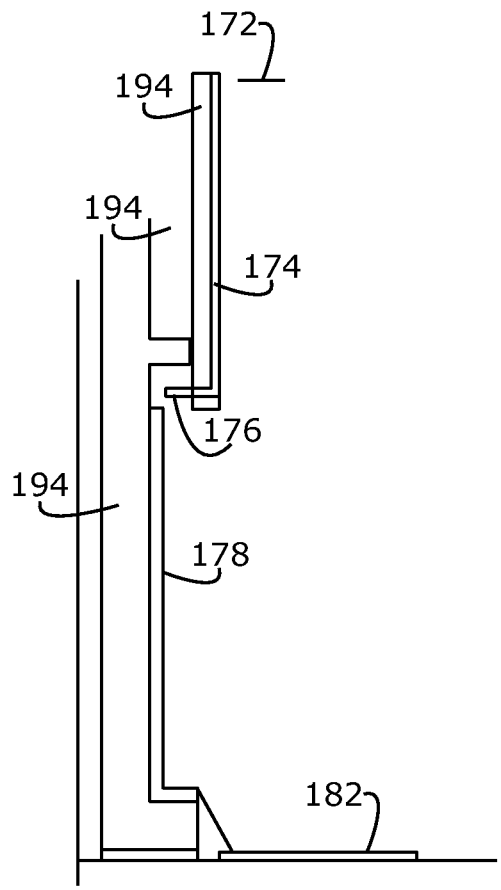
Figure 5C:
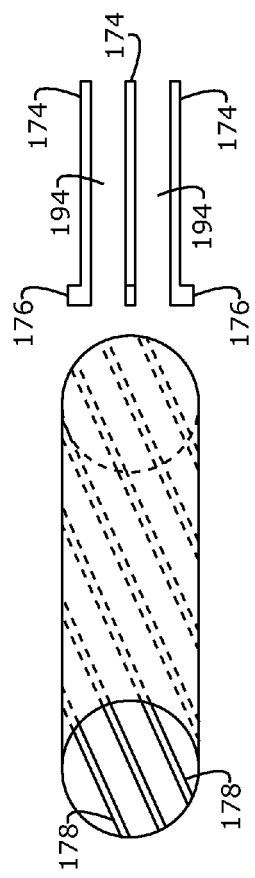
Figure 5D:
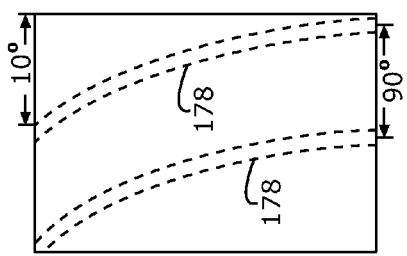
FIG. 5d a detailed schematic view of a portion of the barber pole contact system of FIG. 5c.
Figure 6:
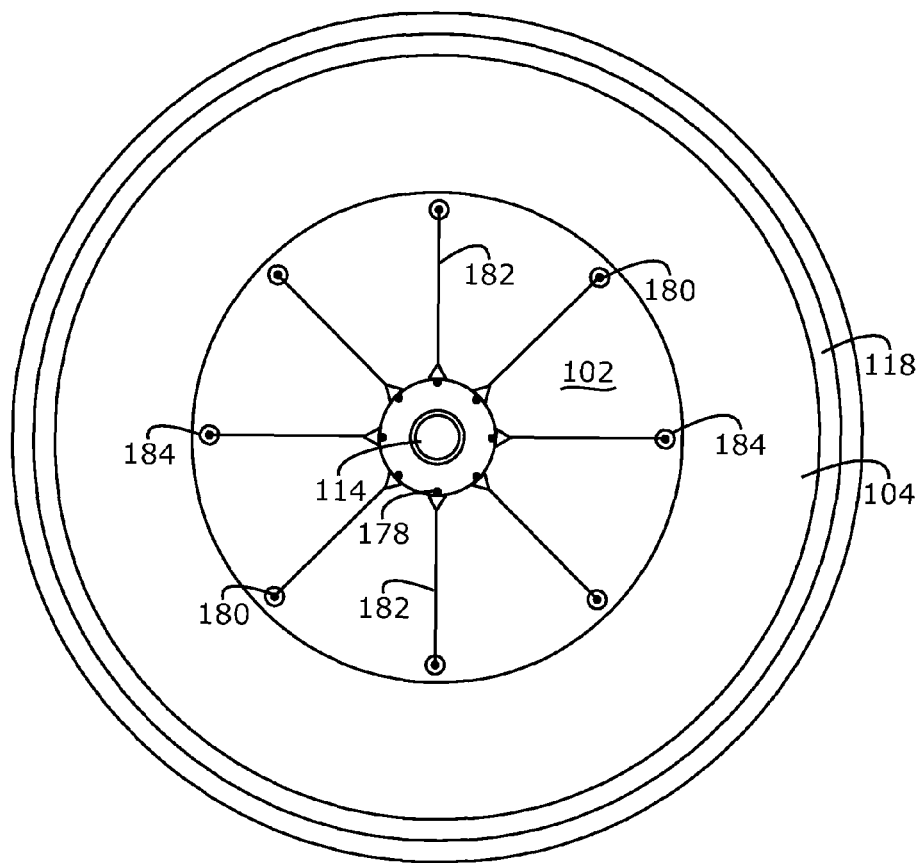
FIG. 6 is a cross-sectional view of the ignition system.

Referring now to FIGS. 5a, 5b, 5c, 5d and 6, there are shown detailed, cross-sectional; detailed side, elevational, cross-sectional; perspective, schematic view of a barber pole contact system; detailed schematic view of a portion of the barber pole contact system of FIG. 5c; and a cross-sectional view of the electrical system, respectively. The ignition system of the inventive rotary engine derives it electrical energy from electrical generator 148. Electrical energy from a rotating portion of electrical generator 148 is provided at a set of four contact points 172. One contact point 172 is provided for each combustion chamber 106 (FIG. 1) of engine 100 (i.e., a total of four contact points 172 in the exemplary embodiment). It will be recognized that other numbers of contact points 172 may be required for other engine configurations wherein combustion chambers 106 (FIG. 1) are, is successive layers, offset at an angle, typically ranging between 45° and 90°. However, it will be recognized that other offset arrangements are possible and the invention is not limited a particular angular offset between combustion chambers in different layers or stages, not shown, of the engine. Sliding contact strips 174 are disposed to receive electrical energy from generator 148 through contact points 172. Sliding contact strips 174 have an electrical contact 176 disposed at or near a distal end thereof. Electrical insulation 194 is disposed in several places as may be seen in FIGS. 5a, 5b, 5c, 5d and 6. It will be recognized that electrical insulation 194 may be a polymeric, ceramic, or another insulation type known to those of skill in the art. As the electrical insulation per se forms no part of the present invention, the invention covers any possible type of electrical insulation.

A set of "barber pole" contact strips 178 are disposed on and electrically insulated from an exterior surface of fuel chamber 114 (also identified as hollow, stationery shaft 162). The contacts strips are twisted about the cylindrical surface of fuel chamber 114 at an acute angle relative to a major axis of fuel chamber 114. In the embodiment chosen for purposes of disclosure, an acute angle of approximately 12° has been found suitable. It will be recognized that as the twist of barber pole contact strips 178 determine the spark advance of the engine 100, different angles may be required depending on fuel, operating conditions, and many additional factors. Consequently, the invention covers any required angle of twist.

Electrical conductors 180 disposed within transverse electrical channels 184 that are connected to radial spokes 182 that are, in turn, connected to barber pole contact strips 178. Electrical conductors 180 convey electrical energy from radial spokes 182 to each layer 100 of the engine. Typically, only four barber pole contact strips 178 are required to provide requisite electrical energy to spark plugs 108 (FIG. 1)*at* offset combustion chambers 106 in different layers of the inventive engine. It will, however, be recognized that many other variations of combustion chamber 106 offset are possible and that the number of barber pole contracts 178 may be adjusted accordingly. A series of radial spokes 182 are connected to electrical conductors 180 which distribute electrical energy to spark plugs 108.

The speed of engine 100 is also regulated by varying the amount of fuel supplied to combustion chambers 106 via nozzles 112. Referring now again to FIG. 4, there is shown a cross-sectional view of several sections 102a, 102b, 102c, 102d of stator 102 of a four-section embodiment of the rotary engine of the invention. Disposed in central fuel supply chamber 114 is a valve assembly 138 that is movable along the major axis thereof. Valve assembly 138 consists of a plurality of fuel regulator sleeves 140a, 140b, 140c, 140d that selectively cover and uncover the proximal ends of fuel supply ducts 110 of respective ones of engines stator sections 102a, 102b, 102c, and 102d. A connecting rod 142 is rigidly attached to each of fuel regulator sleeves 140a, 140b, 140c, 140d. Motion of connecting rod 142 along the major axis of central fuel supply chamber 114 as shown by arrow 150, moves regulator sleeves 140a, 140b, 140c, 140d, thereby controlling the respective areas of the proximal ends of respective ones of fuel supply ducts 110.

Motion of connecting rod 142 may be effected through a linkage to a throttle control, not shown, as is well known to those of skill in the art.

Each regulator sleeve 140a, 140b, 140c, 140d may have a different length and/or be spaced differently along connecting rod 142. This allows progressively feeding fuel to engine sections 100a, 100b, 100c, 100d as required for either smooth starting and acceleration or for progressively energizing engine sections when extra power is required from the engine. Typically, a front most engine section 100a is first energized, followed by successive sections progressively toward the rear of the engine.

In the engine embodiment of FIG. 4, four engine sections 100a, 100b, 100c, 100d are shown vertically aligned. In other words, the combustion chambers 106 (FIG. 1) of each section fire at substantially the same time. It may be advantageous to offset successive engine sections so that in a multi-section engine, ignition of fuel and air occurs at different times in different engine sections (i.e., layers). This minimizes vibration and tends to reduce exhaust noise.

The operation of the rotary engine of the invention is now described. Referring now to FIGS. 7a-7k, there are shown a series of schematic cross-sectional views of a single stage of the novel engine 100. The views are shown in color to clarify the movement of fuel, fresh air, and exhaust as the engine 100 rotates. Table 1 identifies the stages of a single combustion cycle of engine 100 and associates the figure associated with each stage. Note that all degrees of rotation are approximate. It will be recognized that the exact rotational sequence depends upon the fuel type and other design and application factors. Consequently, the invention is not limited to the exact rotational stages chosen for purposes of disclosure but rather covers and any and all variants thereof.

TABLE 1

| Degrees Rotation | Action | FIG. |
|---|---|---|
| 0° | Firing/Ignition | 7a |
| 2° | Bleeder vent 154 opens | 7b |
| 15° | Exhaust opens | 7c |
| 17° | Stage 1 fresh air starts | 7d |
| 30° | Stage 1 fresh air stops | 7e |
| 45° | Exhaust stops | 7f |
| 48° | Stage 2 fresh air starts | 7g |
| 60° | Exhaust reopens | 7h |
| 74° | Stage 2 fresh air stops | 7i |
| 82° | Fueling begins | 7j |
| 88° | Fueling complete | 7k |

Figure 7A:
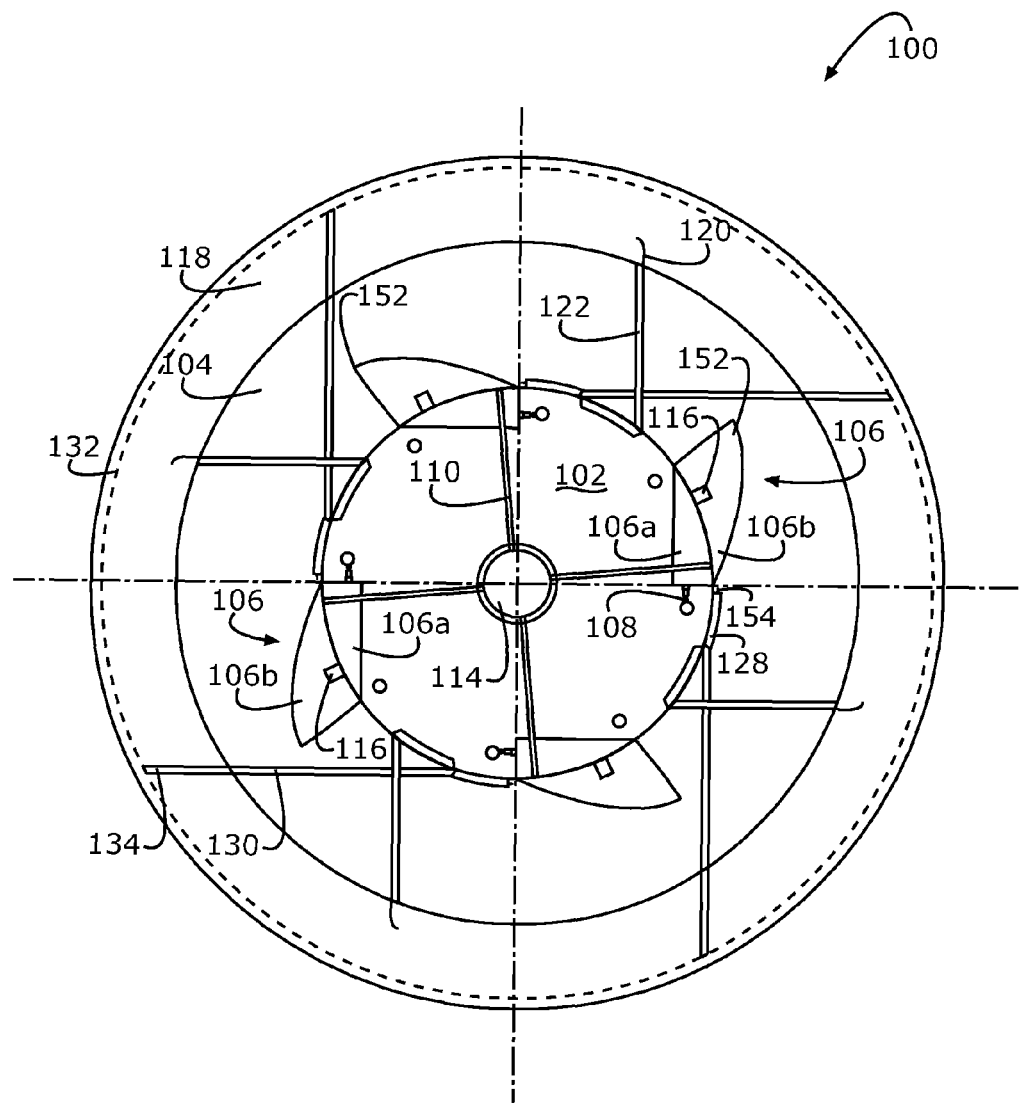
FIGS. 7a-7k are cross-sectional plan views of the engine section of FIG. 1 with the rotor thereof disposed at progressive positions through a combustion cycle.

FIG. 7a shows engine 100 in a 0° reference position. The combustion chambers 106 have previously been fully charged with a mixture of air and fuel and a spark has just been provided by spark plug 108. The mechanism whereby an electrical signal is provided to spark plug 108 is described in detail hereinabove.

As a spark is provided to each charged combustion chamber 106 by sparkplug 108, rotor 104 is impelled in a counter-clockwise direction relative to FIG. 7a by the resulting explosion in combustion chamber 106. The force of the combustion is believed to be concentrated at the apex 152 (i.e., the confluence of the curved and angles walls) of rotor portion 106b of combustion chamber 106. In FIG. 7a, combustion chamber 106 is shown in orange indicating the hot gaseous mixture therein resulting from the explosion of the fuel/air mixture ignited by spark plug 108. As illustrated in FIG. 7a, rotor 104 has not yet moved relative to stator 102.

Figure 7B:
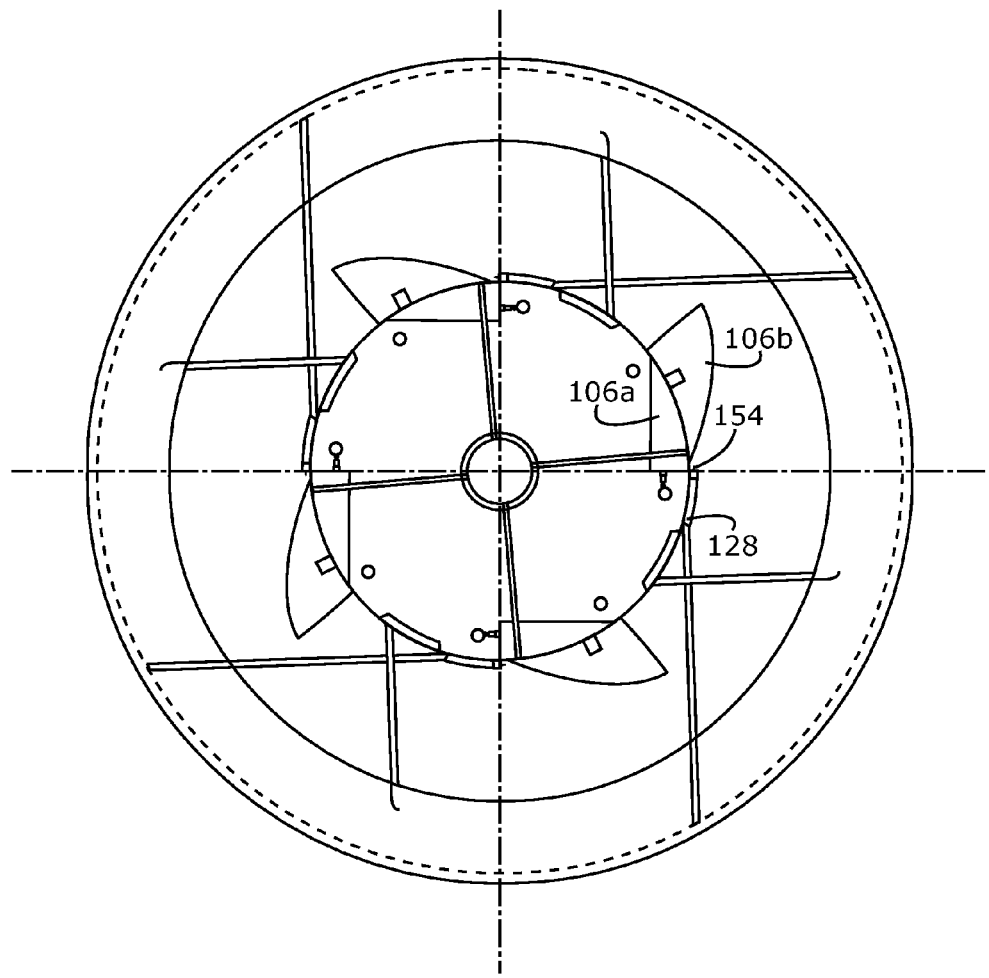

Referring now to FIG. 7b, rotor 104 is shown advanced counterclockwise approximately 2° relative to its position in FIG. 7a. At this point in the rotation of rotor 104, combustion chamber 106 is communicative with a bleeder vent 154. Bleeder vent 154 is a small groove allowing discharge of overpressure from combustion chamber 106. Typically, bleeder vent 154 may have an approximately 0.003 inch cross section. It should be noted, however, that this size may be changed to compensate for the fuel type or another operational parameters. Bleeder vent 154 is small enough that the majority of the explosive force caused by expanding gases within combustion chamber 106 continue to cause counter-clockwise motion of rotor 104. As seen in FIG. 7b, a small amount of the hot exhaust gases have started to flow into exhaust cavity 128.

Figure 7C:
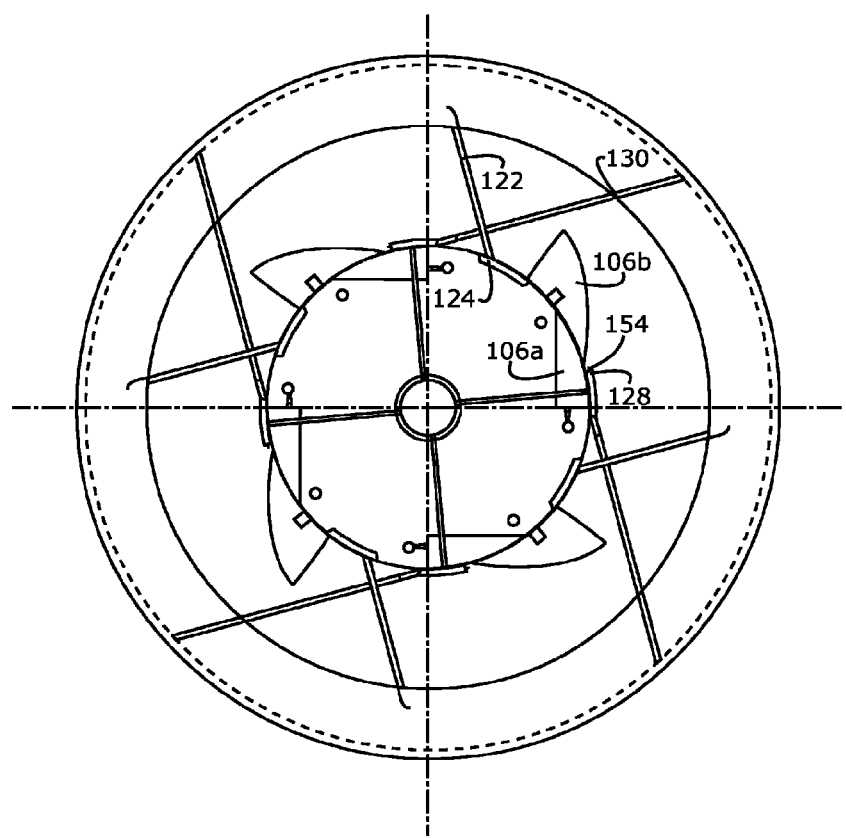

As shown in FIG. 7c, rotor 104 continues moving in a counterclockwise direction. At approximately 15° of rotation, exhaust cavity 128 becomes communicative with stator portion 106a of combustion chamber 106 and exhaust begins to flow through exhaust cavity 128 into exhaust duct 130 and, subsequently, into exhaust ring 132.

Figure 7D:
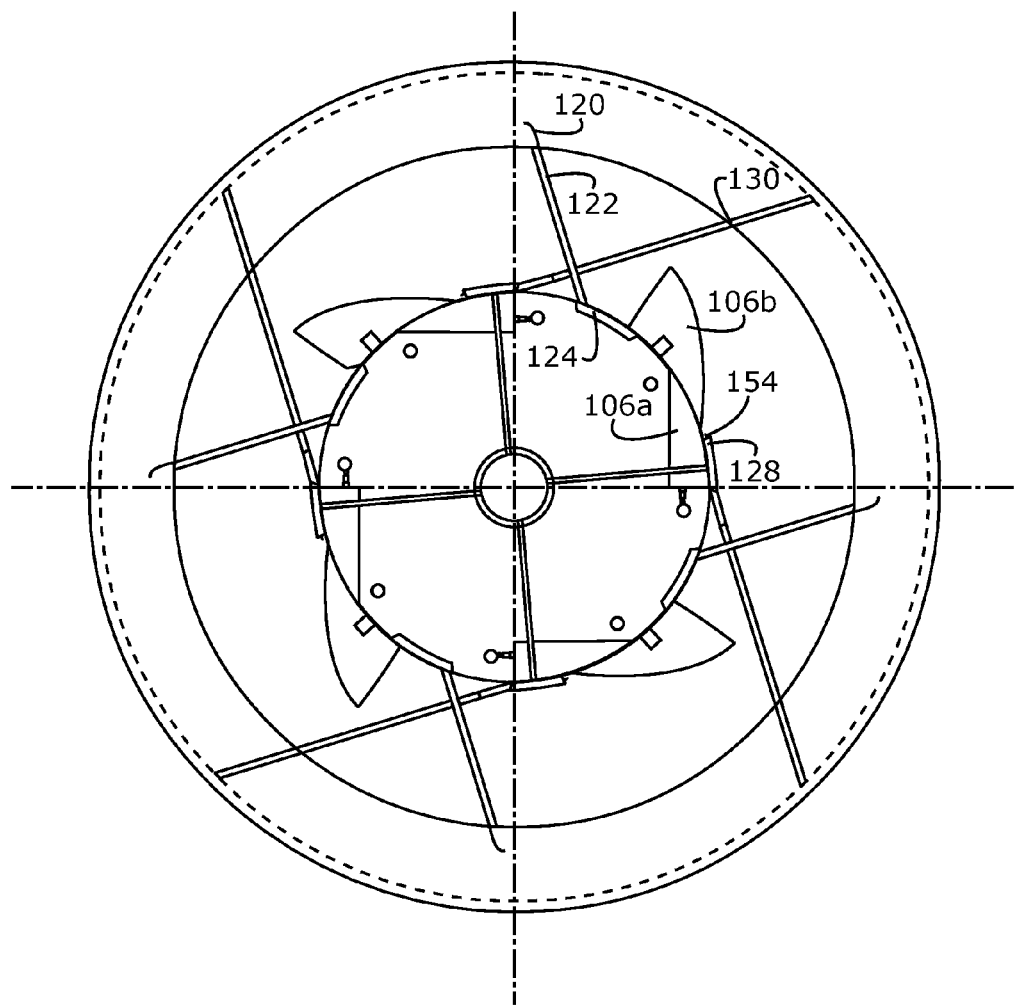

As may be seen in FIG. 7d, at approximately 7° of rotation fresh air shown in green begins to flown into rotor portion 106b of combustion chamber 106. Fresh air flows twice during a combustion cycle, first stage flow commencing at approximately 17°. Air from combustion air supply 118, is directed by air scoop 120 into combustion air inlet duct 122. Combustion air duct 122 terminates at air inlet cavity 124. Air from air inlet cavity 124 flows into rotor portion 106b of combustion chamber 106. Air entering rotor portion 106b of combustion chamber 106 flows into stator portion 106a, thereby forcing exhaust gases through exhaust cavity 128 into exhaust duct 130 and purging combustion chamber 106.

Figure 7E:
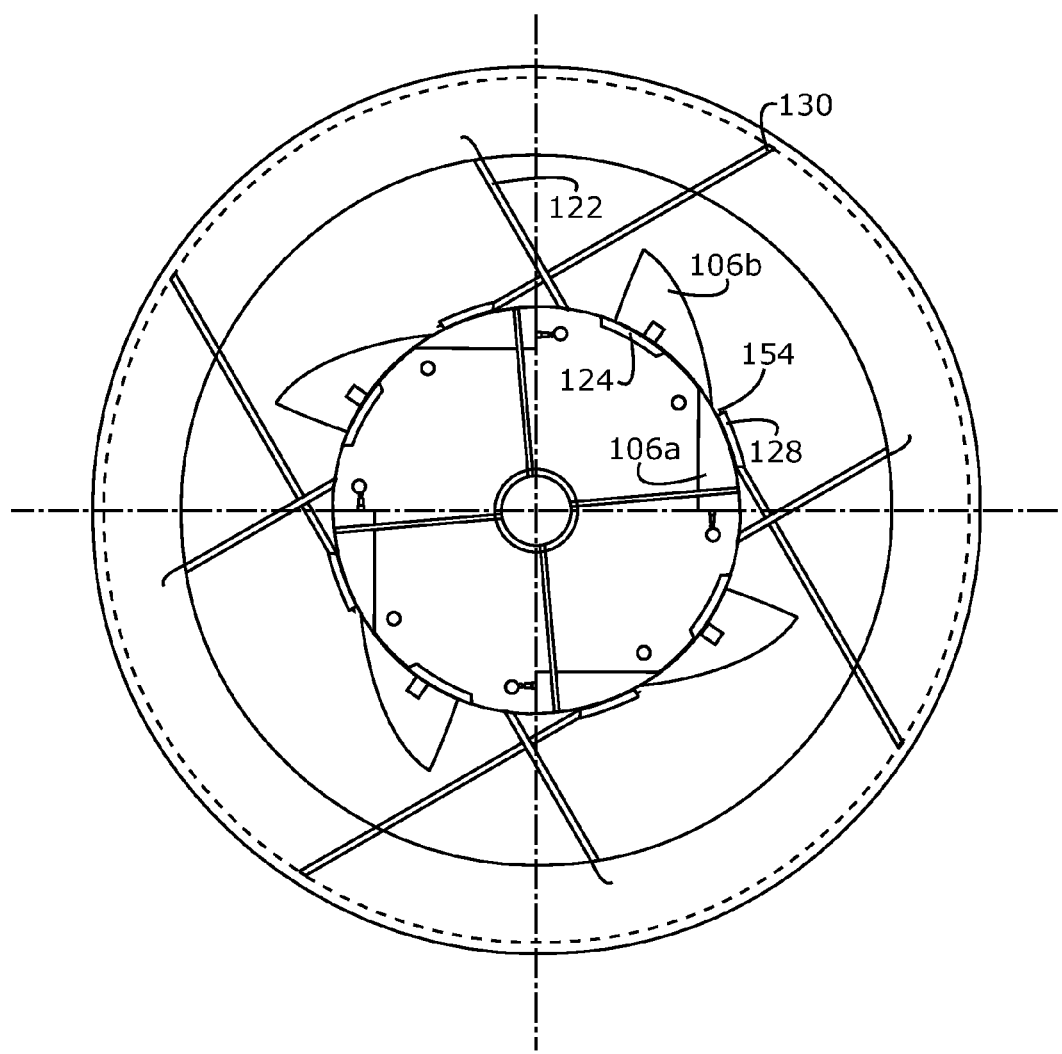

Because of it inertia, rotor 104 continues counterclockwise motion. As seen in FIG. 7e, at approximately 30° of rotation, first stage airflow stops as air inlet cavity 124 is no longer communicative with rotor portion 106b of combustion chamber 106.

Figure 7F:
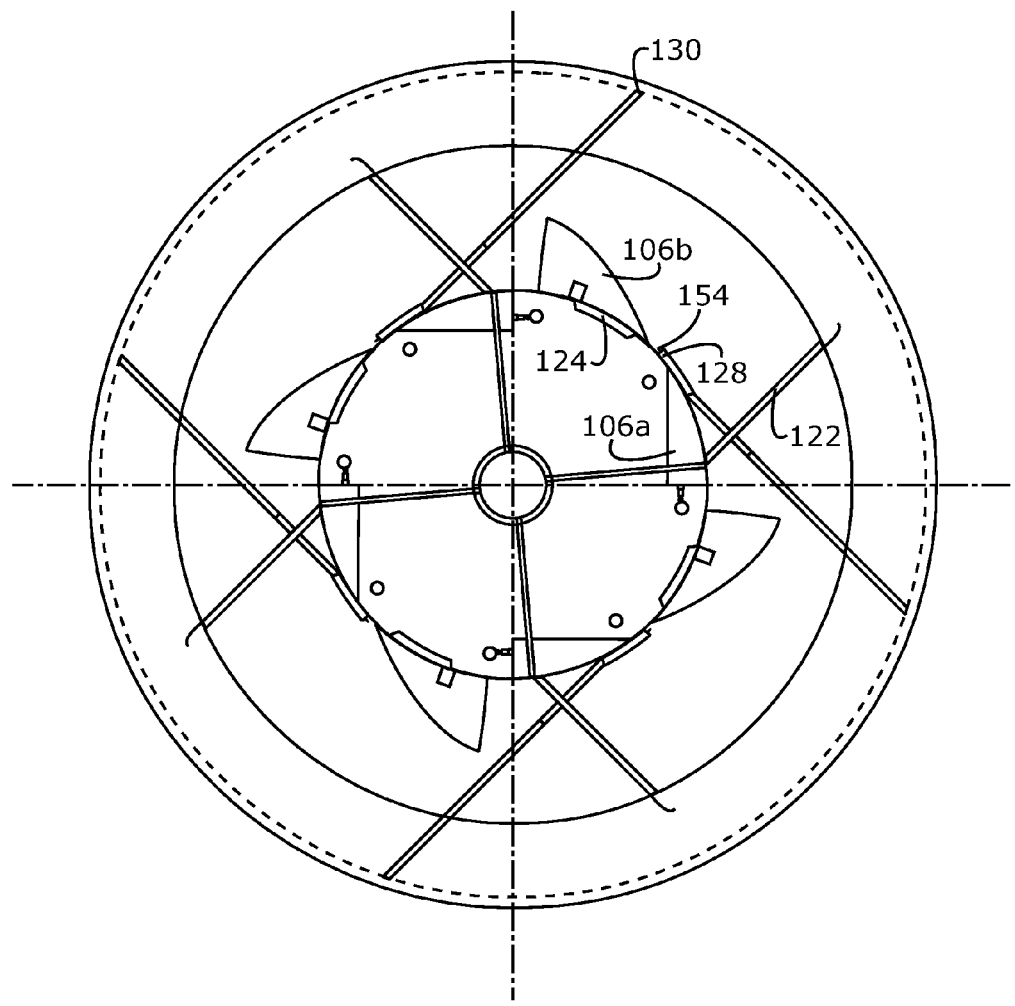
Figure 7G:
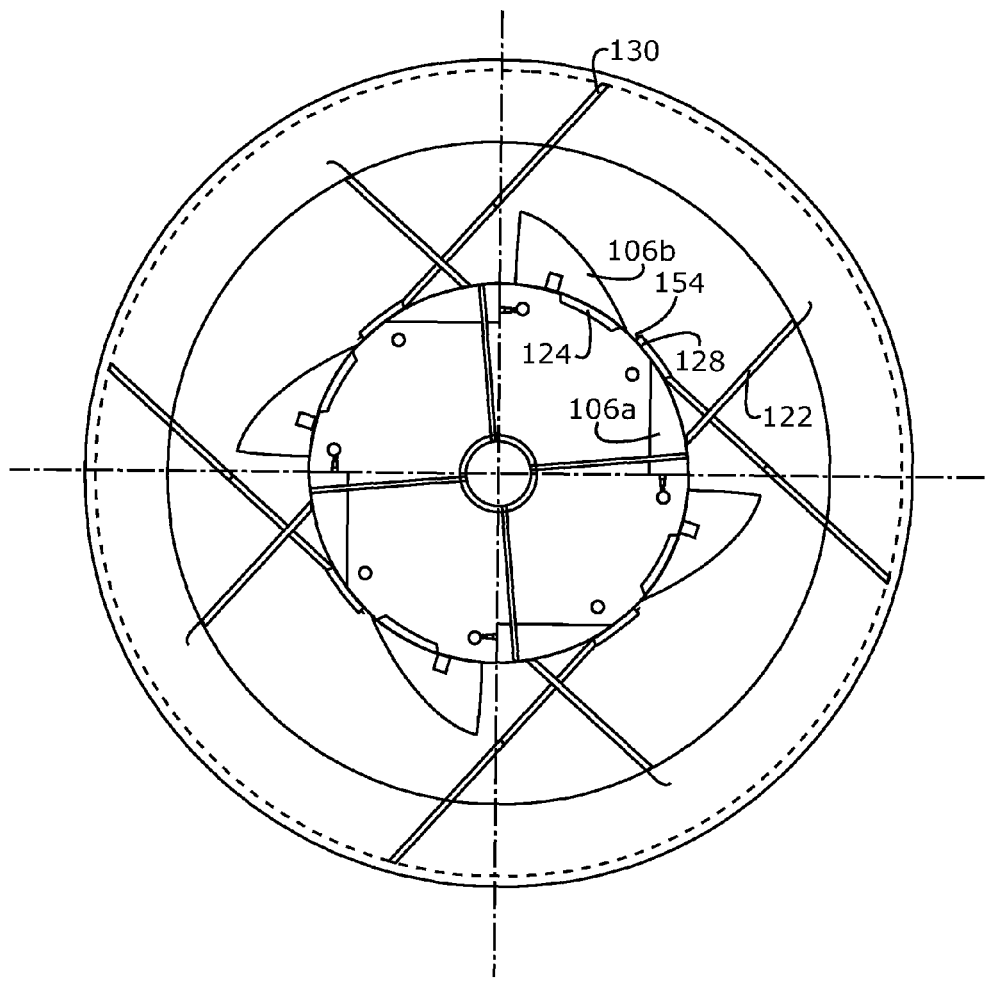

As rotation of rotor 104 continues, at approximately 45° of rotation, exhausting ceases as exhaust cavity 128 is no longer communicative with stator portion 106a of combustion chamber 106. At this time, virtually all exhaust products have been purged from combustion chamber 106. The 45° orientation is shown in FIG. 7f.

At approximately 48° rotation (FIG. 7g), stage two fresh air intake begins. The fresh air now entering combustion chamber 106 will eventually be mixed with fuel to form the explosive fuel/air mixture that will be ignited by spark plug 108 at 0° rotation. Second stage fresh air inflow or charging continues until approximately 74° of rotation.

Figure 7H:
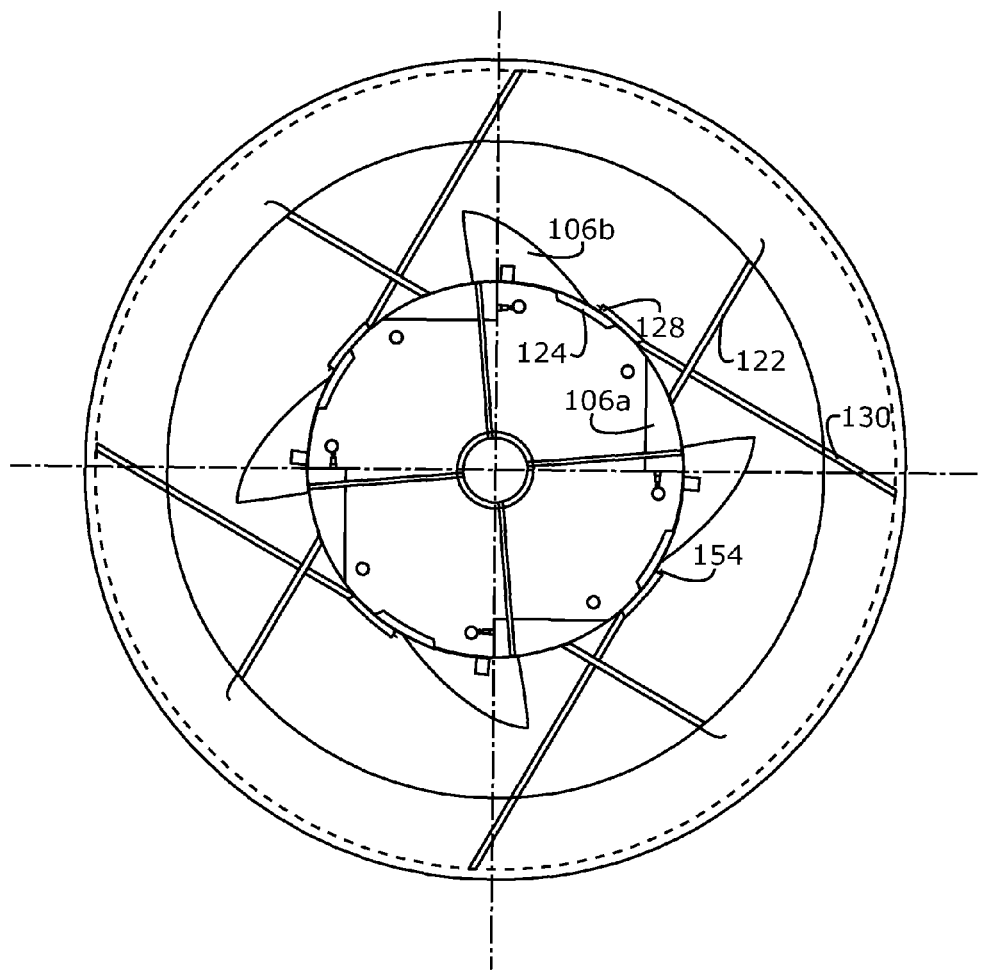

As shown in FIG. 7h, at approximately 60° of rotation, the exhaust reopens.

Figure 7I:
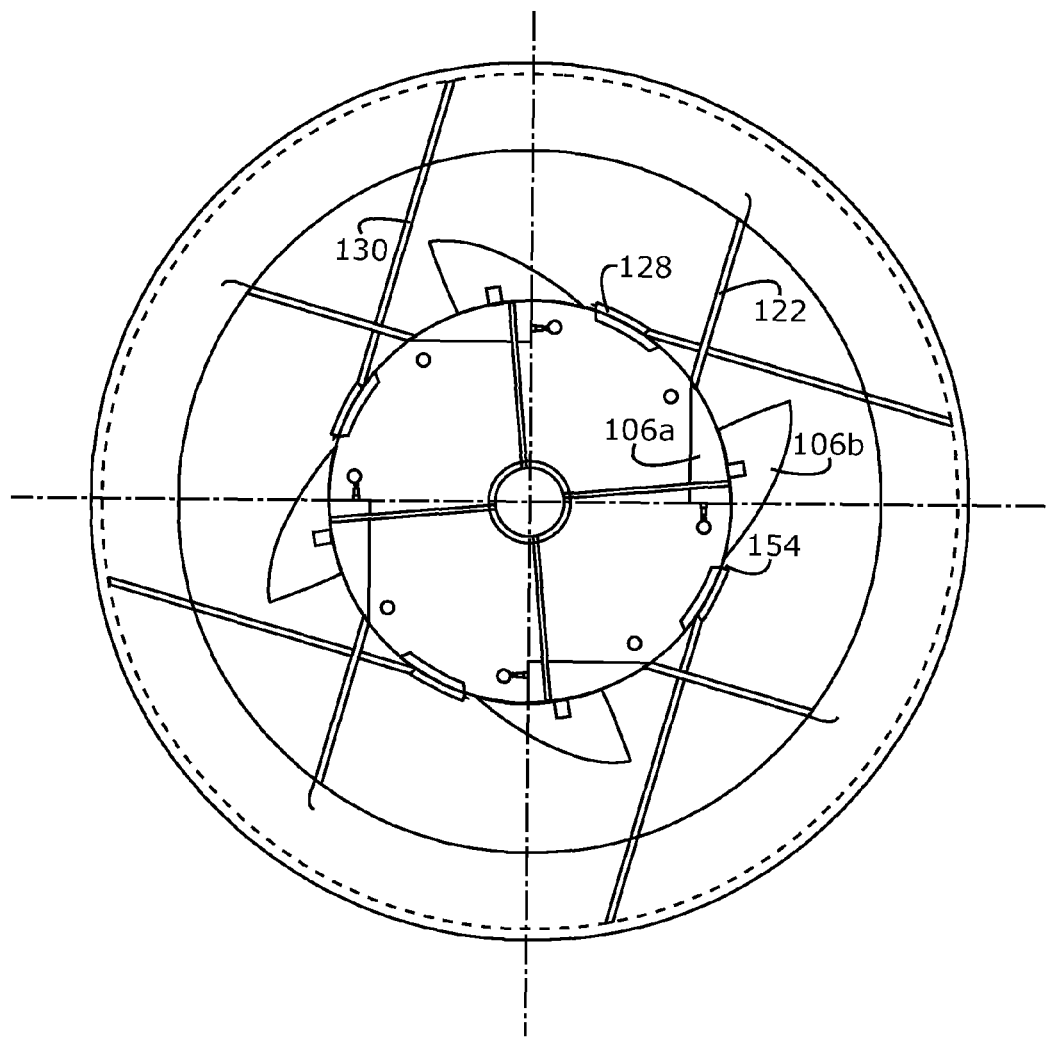
Figure 7J:
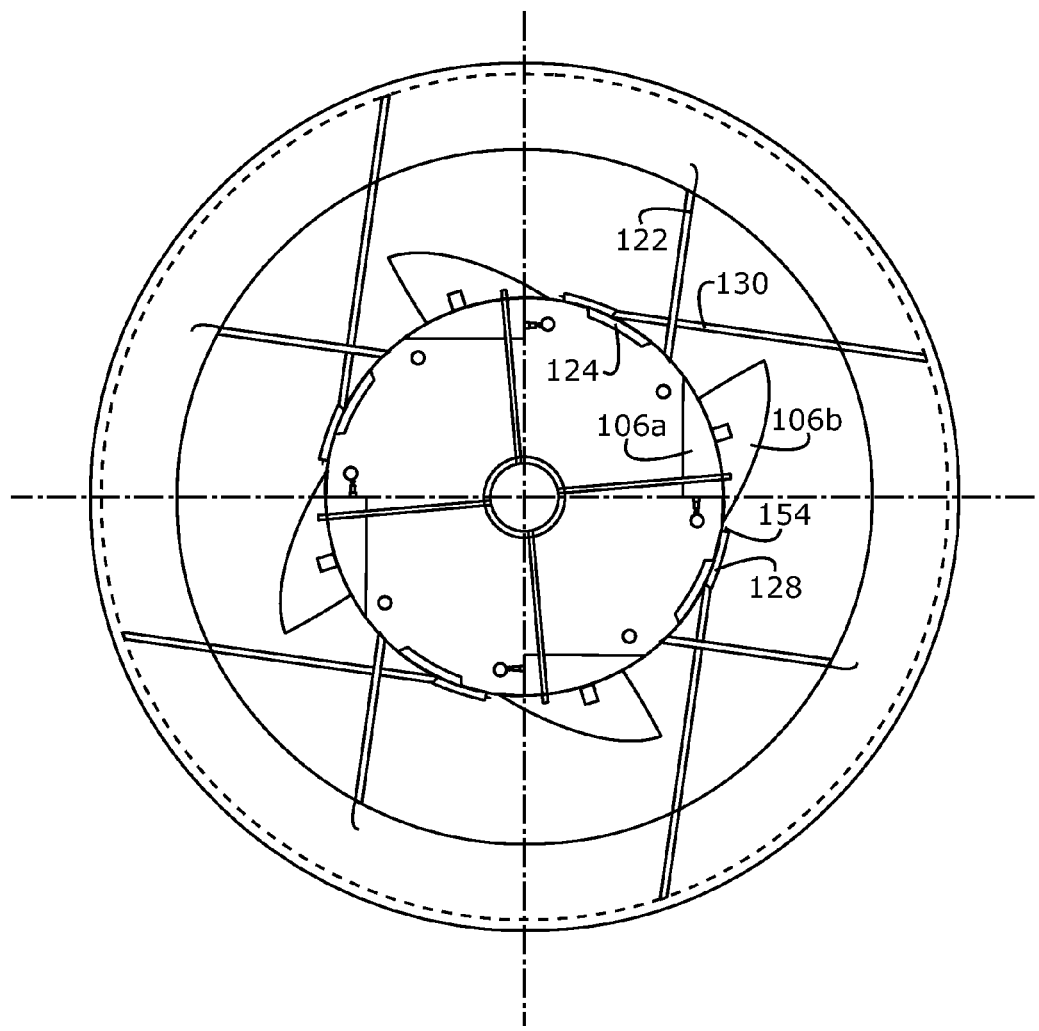
Figure 7K:
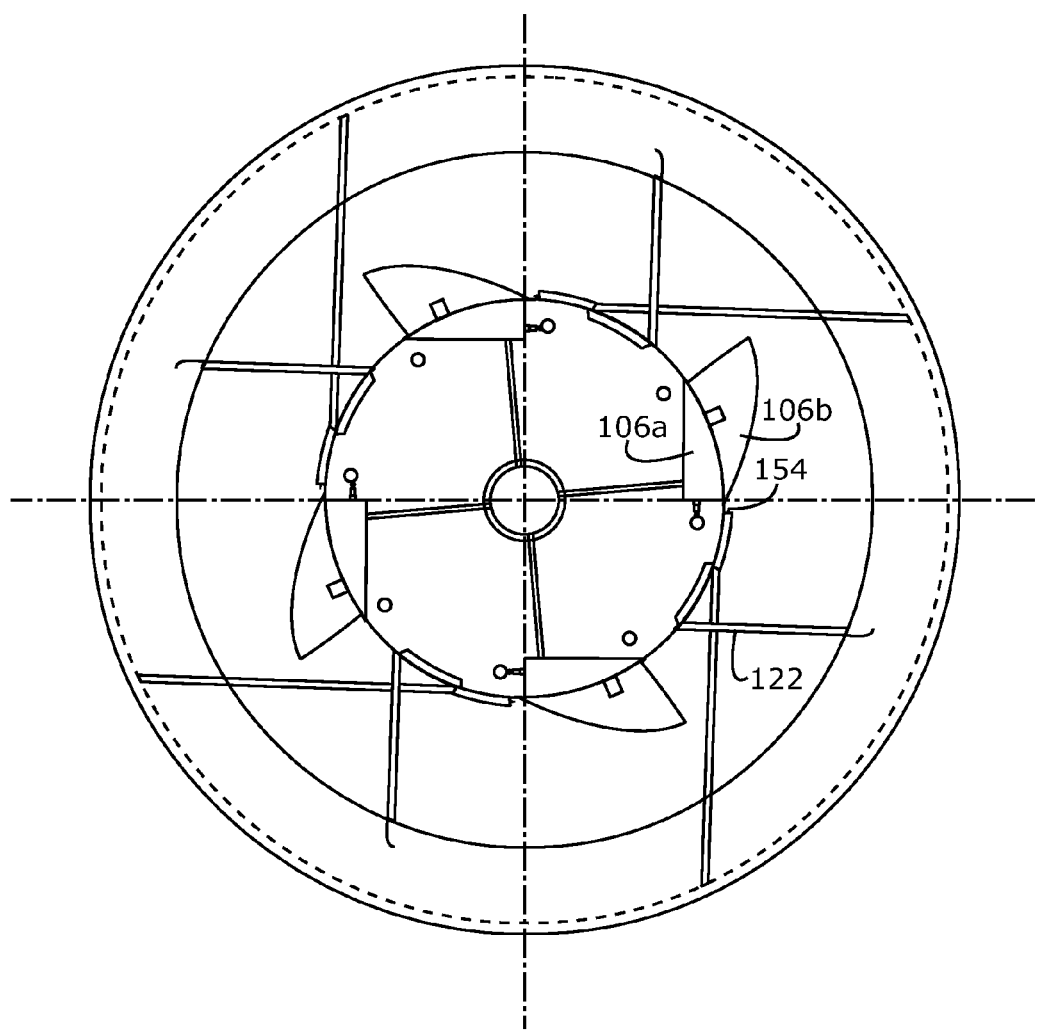
Figure 8:
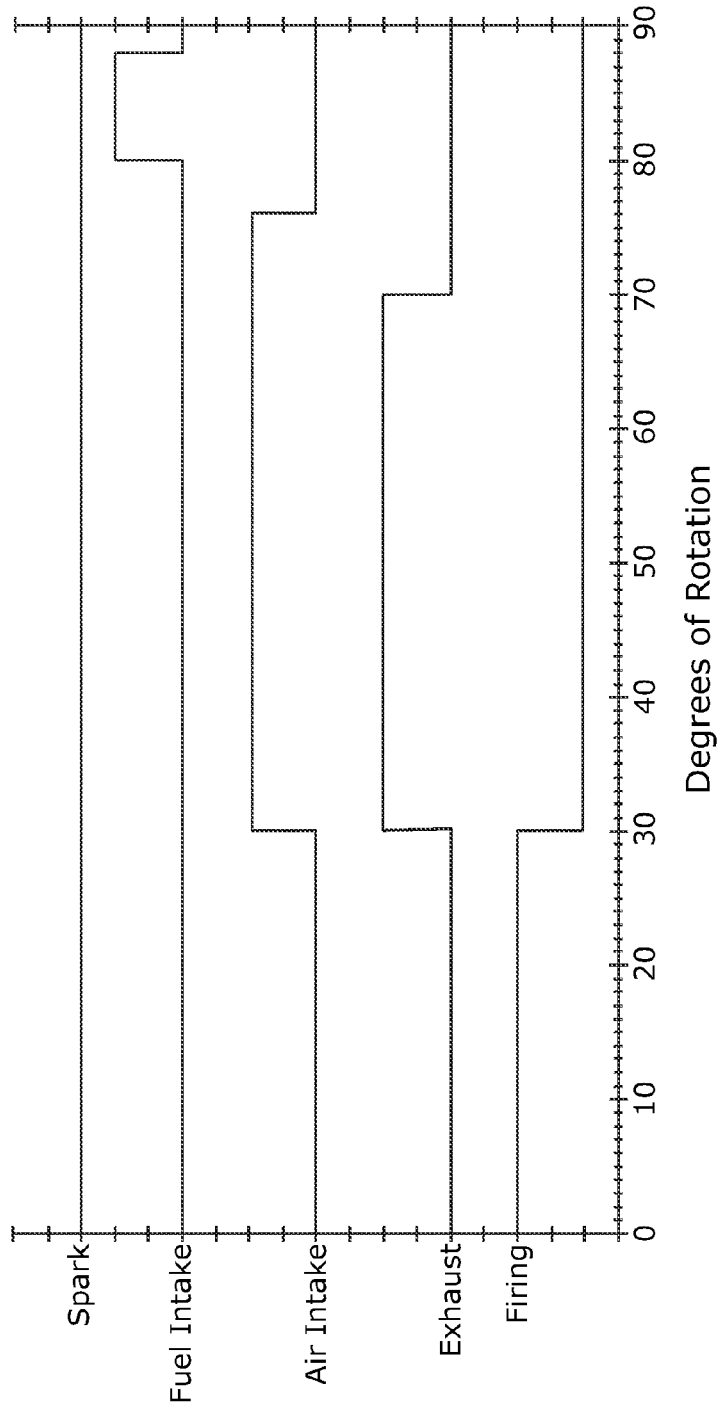
FIG. 8 is a timing diagram showing of one cycle (e.g., 90° of rotation) of a combustion chamber of the engine of FIG. 1.

As shown in FIG. 7i, at approximately 74° rotation, stage two fresh air intake ceases.

At approximately 82° rotation (FIG. 7j), fueling begins.

At approximately 88° (FIG. 7k) fueling terminates and combustion chamber 106 is fully charged in anticipation of ignition as rotor 104 rotates to 90° or, in the foregoing description, again reaches 0°.

It will be recognized that additional cooling and/or lubrication systems may be required to create a functional engine. Such systems are believed to be known to those of skill in the art are not further described herein.

It will be further recognized that seals 196 (FIG. 4) are required between successive sections or layers of the rotary engine. Seals 196 may be implemented in numerous ways known to those of skill in the art. Consequently, such seals are not further described herein.

The stacked sections of the rotary engine may be given a slight front-to-back taper to help maintain sealing as engine temperatures change.

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A pistonless, rotary internal combustion engine apparatus comprising:
   a) at least one fixed/stationary member;
   b) means for supporting said fixed/stationary member operatively attached thereto;
   c) a rotating member circumferentially surrounding said fixed/stationary member;
   d) at least four combustion chambers each having a first portion disposed in said fixed/stationary member and a second portion disposed in said rotating member;
   e) means for supplying pressurized fuel to said combustion chamber;
   f) means for supplying fresh air to said combustion chamber;
   g) means for evacuating combustion gases from said combustion chamber;
   h) means for igniting combustible gases in said combustion chamber; and i) a plurality of exhaust pressure relief vents extending from the circumference of each combustion chamber to said combustive gas exhaust opening.

2. The pistonless, rotary internal combustion engine apparatus in accordance with claim 1, wherein said fixed/stationary member is substantially cylindrical and comprises an outside diameter chosen to fit within said rotating member while allowing rotation of said rotating member around said fixed/stationary member.

3. The pistonless, rotary internal combustion engine apparatus in accordance with claim 1, wherein said fixed/stationary member is tapered such that the outside diameter of said fixed/stationary member gradually decreases along an axis thereof.

4. The pistonless, rotary internal combustion engine apparatus in accordance with claim 1, wherein said rotating member is cylindrical and further comprises an inner diameter whose dimensions are such that said rotating member is sufficiently large to permit circumferential rotation of said rotating member about said fixed/stationary member.

5. The pistonless, rotary internal combustion engine apparatus in accordance with claim 1, wherein said rotating member is alternatively tapered such that the inside diameter of said rotating member decreases gradually from one axial end to the other.

6. The pistonless, rotary internal combustion engine apparatus in accordance with claim 1, further comprising an electrical generator rotationally conjoined to said rotating member.

7. The pistonless, rotary internal combustion engine apparatus in accordance with claim 1, further comprising at least one selected from the group: transmission, gearbox, and pulley system, rotationally conjoined to said rotating member.

8. The pistonless, rotary internal combustion engine apparatus in accordance with claim 1, further comprising means for cooling said rotating member.

9. The pistonless, rotary internal combustion engine apparatus in accordance with claim 1, further comprising means for lubricating said rotating member.

10. The pistonless, rotary internal combustion engine apparatus in accordance with claim 1, further comprising means for rotationally conjoining a motor or rotary solenoid selected from the group electric or pneumatic, to said rotating member for imparting rotational motion thereto when said motor or rotary solenoid is energized.

11. The pistonless, rotary internal combustion engine apparatus in accordance with claim 1, further comprising at least one air intake opening disposed in the circumference of said fixed/stationary unit.

12. The pistonless, rotary internal combustion engine apparatus in accordance with claim 1, further comprising a means for communicating rotationally with said air intake means.

13. The pistonless, rotary internal combustion engine apparatus in accordance with claim 1, further comprising at least one fuel intake opening in the circumference thereof.

14. The pistonless, rotary internal combustion engine apparatus in accordance with claim 1, further comprising a means for communicating with said fuel intake means.

15. The pistonless, rotary internal combustion engine apparatus in accordance with claim 1, further comprising at least one combustive gas exhaust opening in the circumference thereof.

16. The pistonless, rotary internal combustion engine apparatus in accordance with claim 1, further comprising a means for communicating with said combustive gas exhaust means.

17. The pistonless, rotary internal combustion engine apparatus in accordance with claim 1, further comprising at least six surfaces such that at least one surface is angled or curved in the direction of rotation of said rotating member.

18. The pistonless, rotary internal combustion engine apparatus in accordance with claim 1, further comprising at least two separate cavities wherein the circumferential diameter of the open side of said cavities are equal in dimension such that aligning said open sides forms a single geometrically formed cavity or chamber.

19. The pistonless, rotary internal combustion engine apparatus in accordance with claim 1, further comprising a plurality of electrically actuated ignition apparatuses mechanically operatively connected to said fixed/stationary member such that a portion of each ignition apparatus protrudes into one of said combustion chambers.

20. The pistonless, rotary internal combustion engine apparatus in accordance with claim 1, wherein said pressure relief vents are tubular and comprise a diameter sufficiently large to prevent over pressurization of said combustion chambers, but sufficiently small to maintain normal operational pressures.

21. The pistonless, rotary internal combustion engine apparatus in accordance with claim 1, further comprising means for supplying pressurized, combustive fuel to said fuel intakes.

22. The pistonless, rotary internal combustion engine apparatus in accordance with claim 1, further comprising a cooling fan rotationally conjoined to said rotating member for generating turbulent air flow when said rotating member is in motion.

23. The pistonless, rotary internal combustion engine apparatus in accordance with claim 22, further comprising a plurality of curved members conjoined to and extending radially outward from said rotating member.

24. The pistonless, rotary internal combustion engine apparatus in accordance with claim 22, further comprising means for conjoining said fan to said rotating member.

25. The pistonless, rotary internal combustion engine apparatus in accordance with claim 1, further comprising means for conjoining said rotating member to at least one additional rotating member such that said both rotating members share a common axis, common systems, and wherein additional combustion chambers in said at least one other rotating member are angularly offset from combustion chambers in at least one other of said conjoined rotary members.

26. The pistonless, rotary internal combustion engine apparatus in accordance with claim 1, further comprising means for aligning said stationary/fixed and rotational members for rotationally aligning said first portion and said second portion of said combustion chambers.

27. The pistonless, rotary internal combustion engine apparatus in accordance with claim 1, wherein said fixed/stationary member is hollow along its axial length for storing and transporting at least one selected from groups of fluids, and gases therein.

28. The pistonless, rotary internal combustion engine apparatus in accordance with claim 1, further comprising at least one fuel nozzle disposed within said combustion chamber and conjoined to said fuel intake port.

29. The pistonless, rotary internal combustion engine apparatus in accordance with claim 1, further comprising a hollow cylinder axially disposed and conjoined to a cylindrical cavity in said fixed/stationary member for the purpose of fuel distribution.

30. The hollow cylinder in accordance with claim 29, further comprising at least one cylindrical sleeve for fuel regulation.

31. The pistonless, rotary internal combustion engine apparatus in accordance with claim 1, wherein said means for igniting combustible gases in each of said at least four combustion chambers comprises:
  i) an electrically conductive cylindrical rod;
  ii) an insulating sheath surrounding said electrically conductive rod, and allowing sliding movement thereof through said insulating sheath;
  iii) a hollow, electrically conductive base member having an inside diameter sized to allow engagement therein of at least a portion of said insulating sheath; and
  iv) means for supplying electrical current to said electrically conductive rod operatively connected thereto.

32. The pistonless, rotary internal combustion engine apparatus in accordance with claim 31, wherein said insulating sheath is cylindrical in construction with an inner diameter sufficiently large to permit said conductive rod to pass axially through its entire length.

33. The pistonless, rotary internal combustion engine apparatus in accordance with claim 31, wherein said electrically conductive base member has a threaded outer diameter greater than an outer diameter of said insulating sheath.

34. The pistonless, rotary internal combustion engine apparatus in accordance with claim 31, wherein said electrically conductive base member is cylindrical in construction with an inner diameter sufficiently large to permit said insulating sheath to protrude axially into said base member.

35. The pistonless, rotary internal combustion engine apparatus in accordance with claim 31, further comprising means of conjoining an electrical conductor to said conductive rod member.

* * * * *